P. P. POLITOWSKI.
ELECTRIC CELL.
APPLICATION FILED FEB. 14, 1920.

1,402,956.

Patented Jan. 10, 1922.
2 SHEETS—SHEET 1.

Witness:
Eb. R. Olson

Inventor:
Peter Paul Politowski.
by Andrews & Lundell
Atty's

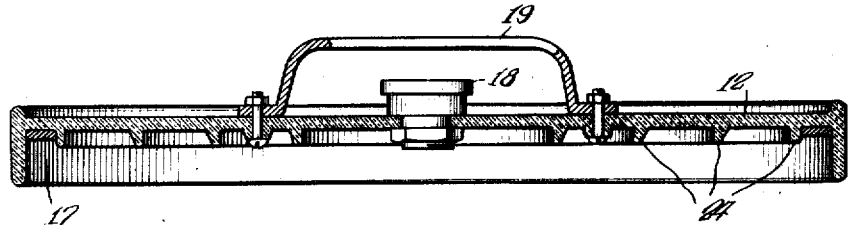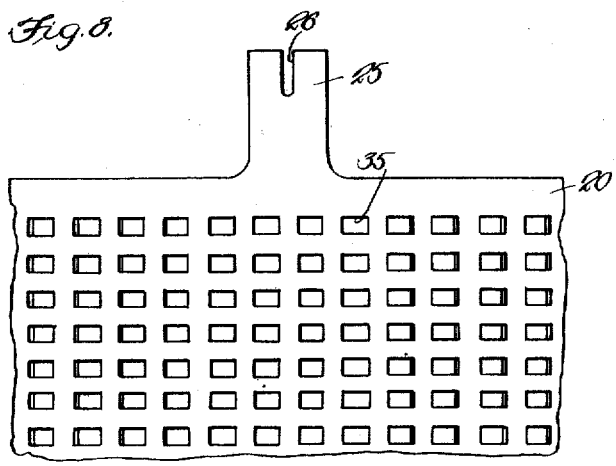

UNITED STATES PATENT OFFICE.

PETER PAUL POLITOWSKI, OF CHICAGO, ILLINOIS.

ELECTRIC CELL.

1,402,956.  Specification of Letters Patent.  Patented Jan. 10, 1922.

Application filed February 14, 1920. Serial No. 358,644.

*To all whom it may concern:*

Be it known that I, PETER PAUL POLITOWSKI, a citizen of the United States, residing at Chicago, in the county of Cook and State of Illinois, have invented certain new and useful Improvements in Electric Cells, of which the following is a specification.

The invention relates to electric cells, primarily adapted to be applied to storage cells for electric batteries. The object of the invention is to produce a compact cell which can be used alone, or, if desired, in batteries, and which is arranged for portability, so that it may be conveniently and safely carried from place to place, in automobiles or other vehicles, or otherwise, without injury to the cell itself, or to anything that may be in the neighborhood of the cell. A further object of the invention is to produce an exceedingly efficient cell for various purposes, one that will have, when properly charged, a very high electromotive force, and for its size a large amperage, and one in which the leakage between the grids is less than with ordinary types of cells.

Figure 1:
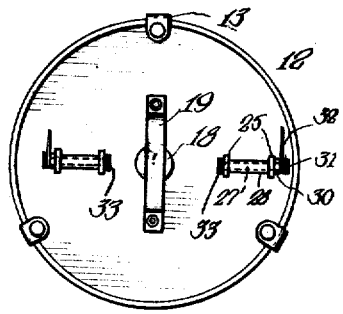
Figure 3:
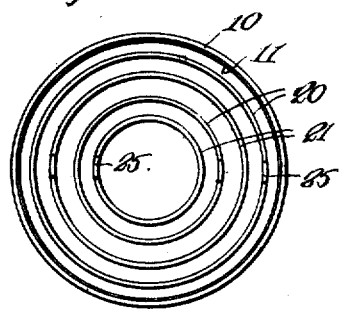
Figure 2:
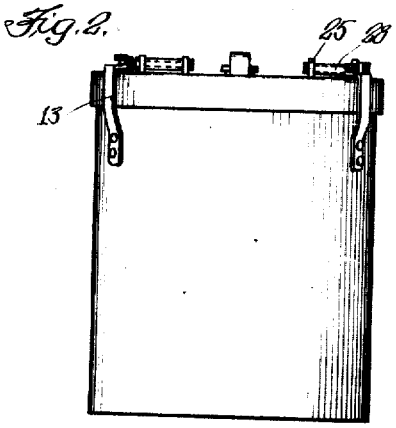
Figure 4:
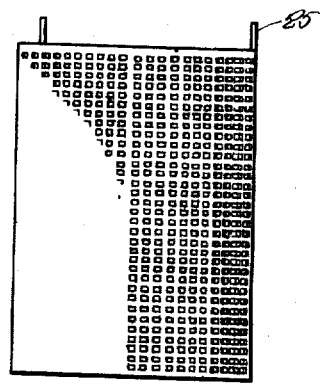
Figure 5:
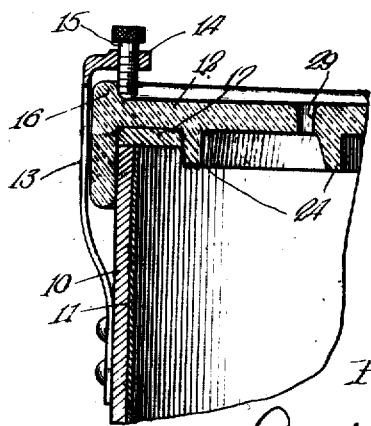

Of the accompanying drawings Fig. 1 is a plan view of a cell, which embodies features of my invention; Fig. 2 is an elevation of the same; Fig. 3 is a plan view of the cell with the cover removed; Fig. 4 is an elevation of one of the plates of the cell; Fig. 5 is an enlarged sectional view of the cover clamping means; Fig. 6 is an enlarged central sectional view of the cover of the cell; Fig. 7 is an enlarged central sectional view of means for separating the plates; and Fig. 8 is an enlarged detail view of a portion of one of the plates of the cell.

The cell comprises a cylindrical metal casing 10, the entire inner surface of which is coated with a suitable insulation enamel composition 11. The casing is closed by means of a cover 12 made of any suitable material as glass. The cover fits snugly over the casing, and is held thereon by any suitable means. I prefer for this purpose the spring clips 13 which are fixed to the casing and extend upwardly and over the cover 12. In the projecting arm 14 of the clip is threaded a thumb screw 15. A flange 16 extends around the periphery of the cover and by means of the thumb screws the cover may be held firmly in place. A gasket 17 is provided between the cover and the casing, so as to prevent leakage of the electrolyte, and to act as a buffer between the glass and the metal casing. By this means it will be seen that, by unscrewing the thumb screws a sufficient distance one of the clips 13 may be sprung outwardly and the cover may be removed, and may be as quickly replaced when desired, and it may be held so snugly in place that there is no danger of leakage of the acid, and no rattling of the parts. A handle 19 is provided which is fixed to the cover, and an ordinary vent cap 18 is provided to allow more conveniently passing liquids into the cell and also to allow the gas within to escape.

The interior of the cell comprises grids 20 and 21. These grids are cylindrical and are placed concentric with the casing, and the grids 20 alternate with the grids 21, the grids 20 being positive and the grids 21 being negative. As many grids may be used as is desired. In the illustration four only are shown in order to avoid confusion. But it is evident that more grids may be used, and that the number of grids would depend more or less upon the size of the cell.

In order to hold the grids in position, and also to increase the insulation between the plates and the casing, I provide a circular insulation plate 22 adapted to fit on the bottom of the casing, the plate having annular flanges 23 concentric with the casing, which are adapted to hold the lower ends of the cylindrical grids in their proper positions; it being understood that the distance between the flanges and the number of flanges would be adapted to the desired distance between the grids and the number of grids. In order to maintain the proper position of the upper ends of the cylindrical grids, I provide annular flanges 24 on the under surface of the cover, these flanges also assisting materially in strengthening the cover so that it may be safely used as a support for the handle 19.

Each of the grids is provided with a terminal 25, fixed to the upper end of the grid and arranged to pass through a slot 29 suitably positioned in the cover 12. For convenience the terminals of the positive grids are positioned on one side of the handle of the cover and the terminals of the negative grids are positioned on the other side of the cover. Each of the terminals has a slot 26 in its upper end and a bolt 27 is adapted to be placed in all of the slots of one set of terminals, with an insulation tube or thimble 28 encircling the bolt between each pair of terminals. And a lock nut 30 and a knurled nut 33 hold the bolt firmly in place. A knurled nut 31 is used in a well known manner for connecting the external circuit wire 32 to the bolt, and thus to the terminals. By this arrangement it will be seen that, by merely loosening the knurled nut 33, and without disturbing the nuts 30 and 31, which clamp the connecting wire 32 to the bolt, the bolt may be slipped from the slots of the terminals, and the cover of the casing may then be conveniently removed. It will thus be seen that I have provided means for very quickly removing the cover or putting it in place without interfering materially with the external circuit of the cell; it being understood that the external circuit may lead to other cells or to any suitable apparatus either for charging or discharging the battery.

The grids 20 and 21 may be formed of any suitable material and of any suitable form of grid surface. I prefer to have the grids consist of openings 35 through the grids, the horizontal length of the openings being somewhat greater than the vertical width, and the openings being positioned any suitable distance apart. The grids may be of any suitable thickness and material, I prefer for the purpose grids composed of an alloy of lead and about five or ten per cent of zinc. Any suitable substance may be used for filling the openings 36. I prefer bi-chromate of potash for the positive grids and litharge for the negative grids, and for the electrolyte a solution of sulphuric acid of about thirty per cent.

I have discovered that by the use of the grids substantially as described and the chemicals specified, or other suitable chemicals, that the leakage from one grid to the other is materially reduced as compared with the ordinary type of flat grids, and that the rate of charging may be materially increased, a higher voltage being allowable for that purpose, and that the amperage for the weight of the cell is greater than is common.

I claim as my invention:

1. An electric cell comprising a cylindrical casing, a plurality of cylindrical grids in said casing, said grids being substantially concentric and equally spaced, and means for connecting the alternate grids together.

2. An electric cell comprising a plurality of cylindrical grids of unlike diameters positioned in a casing concentric with each other, bi-chromate of potash mounted in one set of grids, and litharge mounted in the other set of grids, the grids of one set alternating with the grids of the other, a solution of sulphuric acid in said casing, and means for connecting together the bi-chromate of potash grids and other means for connecting together the litharge grids.

3. An electric cell comprising a plurality of grids, each of said grids having a terminal projecting upwardly, said grids being mounted in a closed casing, said casing having openings through which the said terminals pass freely.

4. In an electric cell a casing, a plurality of grids in said casing, an insulation member in the bottom of said casing, said member having flanges projecting upwardly to hold the lower ends of said grids in place, and a cover for said casing, said cover having flanges projecting inwardly to hold the upper ends of said grids in place.

5. In an electric cell a casing having a cover, grids in said casing, terminals fixed to said grids and extending through said cover, slots in the external ends of said terminals, and a member positioned in said slots and fixed to said terminals.

6. In an electric cell a casing having a cover, grids in said casing, terminals fixed to said grids and extending through said cover, slots in the external ends of said terminals, and a member positioned in said slots and fixed to said terminals, said member comprising a bolt, a nut on each end of said bolt, and a thimble between each two terminals.

In testimony whereof I hereunto set my hand.

PETER PAUL POLITOWSKI.